US012763962B2

(12) United States Patent
Winarski

(10) Patent No.: US 12,763,962 B2
(45) Date of Patent: Oct. 13, 2026

(54) LOCKING BLOCKCHAIN BLOCKS FOR DATA SECURITY FOR FINITE LENGTH BLOCKCHAINS

(71) Applicant: Tyson York Winarski, Mountain View, CA (US)

(72) Inventor: Tyson York Winarski, Mountain View, CA (US)

( * ) Notice: Subject to any disclaimer, the term of this patent is extended or adjusted under 35 U.S.C. 154(b) by 166 days.

(21) Appl. No.: 17/742,802

(22) Filed: May 12, 2022

(65) Prior Publication Data

US 2022/0393876 A1 Dec. 8, 2022

Related U.S. Application Data

(60) Provisional application No. 63/208,497, filed on Jun. 8, 2021.

(51) Int. Cl.
*H04L 9/00* (2022.01)
*H04L 9/08* (2006.01)
*H04L 9/32* (2006.01)

(52) U.S. Cl.
CPC .......... *H04L 9/3236* (2013.01); *H04L 9/0836* (2013.01); *H04L 9/50* (2022.05)

(58) Field of Classification Search
CPC ........ H04L 9/3236; H04L 9/0836; H04L 9/50
See application file for complete search history.

(56) References Cited

U.S. PATENT DOCUMENTS

| | | | | |
|---|---|---|---|---|
| 2019/0258971 | A1* | 8/2019 | Winarski | G06F 16/122 |
| 2020/0012809 | A1* | 1/2020 | Winarski | H04L 9/3239 |
| 2020/0243205 | A1* | 7/2020 | Sharma | G06F 16/137 |

* cited by examiner

*Primary Examiner* — Syed M Ahsan
(74) *Attorney, Agent, or Firm* — The Winarski Firm, PLLC

(57) ABSTRACT

The present specification discloses a blockchain having a finite number of blockchain blocks secured in a loop with a locking blockchain block executed by instructions stored on a non-volatile computer tangible medium. The blockchain has a genesis blockchain block and a terminating blockchain block that ends the blockchain. The blockchain also has a blockchain lock block that includes a hash digest based on a hash digest from the genesis blockchain block and a hash digest from the terminating blockchain block. The blockchain lock block logically locks the genesis blockchain block to the terminating blockchain block forming the blockchain into a loop by cryptographically linking the genesis blockchain block to the terminating blockchain block, thereby preventing the addition of new blockchain blocks in the blockchain that continue a conventional blockchain through hashes based on just the previous blockchain block.

10 Claims, 18 Drawing Sheets

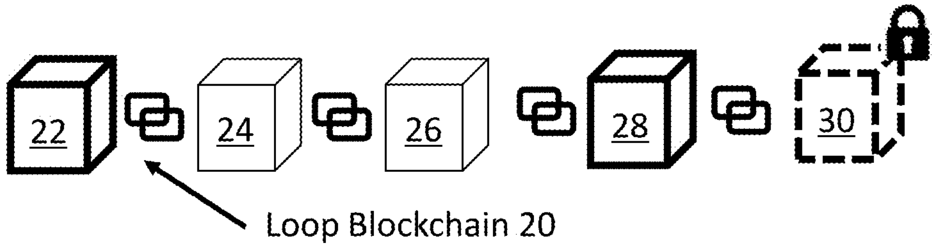

| | |
|---|---|
| LOOP BLOCKCHAIN GENESIS BLOCK 22 | INFORMATION IN BLOCK:<br>*Blockchain Data: Message<br>*Blockchain Metadata: Metadata wrapper 100 (blockchain hash digest of block 22) |
| LOOP BLOCKCHAIN DATA BLOCK 24 | INFORMATION IN BLOCK:<br>*Blockchain Data: Message<br>*Blockchain Metadata: Metadata wrapper 100 (blockchain hash digest of block 22 [prior block] and blockchain hash digest of block 24 [current block]) |
| LOOP BLOCKCHAIN DATA BLOCK 26 | INFORMATION IN BLOCK:<br>*Blockchain Data: Message<br>*Blockchain Metadata: Metadata wrapper 100 (blockchain hash digest of block 24 [prior block] and blockchain hash digest of block 26 [current block]) |
| TERMINATING LOOP BLOCKCHAIN DATA BLOCK (LAST DATA BLOCK) 28 | INFORMATION IN BLOCK:<br>*Blockchain Data: Message<br>*Blockchain Metadata: Metadata wrapper 100 (blockchain hash digest of block 26 [prior block] and blockchain hash digest of block 28 [current block]) |
| LOOP BLOCKCHAIN LOCK BLOCK 30 | INFORMATION IN BLOCK:<br>*Blockchain Data: Message; Ledger listing all blockchain blocks in the blockchain<br>*Blockchain Metadata: Metadata wrapper 100 (blockchain hash digest of block 28 [final data block]; blockchain hash digest of block 22 [genesis block]; blockchain hash digest of block 30 [lock block]); and ledger 104. |

FIG. 3

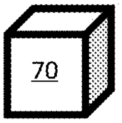

| | |
|---|---|
| FILE GENESIS BLOCKCHAIN BLOCK 70 | INFORMATION IN BLOCK:<br>*Blockchain Data: Message<br>*Blockchain Metadata: Metadata wrapper 100 (blockchain hash digest of block 70) |

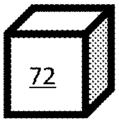

| | |
|---|---|
| FILE BLOCKCHAIN BLOCK 72 | INFORMATION IN BLOCK:<br>*Blockchain Data: Message<br>*Blockchain Metadata: Metadata wrapper 100 (blockchain hash digest of block 70 [prior block] and blockchain hash digest of block 72 [current block]) |

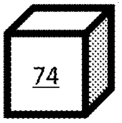

| | |
|---|---|
| FILE BLOCKCHAIN BLOCK 74 | INFORMATION IN BLOCK:<br>*Blockchain Data: Message<br>*Blockchain Metadata: Metadata wrapper 100 (blockchain hash digest of block 72 [prior block] and blockchain hash digest of block 74 [current block]) |

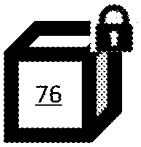

| | |
|---|---|
| LOOP BLOCKCHAIN LOCK BLOCK 76 | INFORMATION IN BLOCK:<br>*Blockchain Data: Message; ledger listing all blockchain blocks in the blockchain segment<br>*Blockchain Metadata: Metadata wrapper 100 (blockchain hash digest of block 74 [final data block of track 62]; blockchain hash digest of block 70 [genesis block of track 62]; and blockchain hash digest of block 76 [lock block]) |

FIG. 16

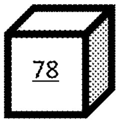

| | |
|---|---|
| FILE BLOCKCHAIN BLOCK 78 | INFORMATION IN BLOCK:<br>*Blockchain Data: Message<br>*Blockchain Metadata: Metadata wrapper 100 (blockchain hash digest of block 74 [prior block] and blockchain hash digest of block 78 [current block]) |

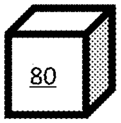

| | |
|---|---|
| FILE BLOCKCHAIN BLOCK 80 | INFORMATION IN BLOCK:<br>*Blockchain Data: Message<br>*Blockchain Metadata: Metadata wrapper 100 (blockchain hash digest of block 78 [prior block] and blockchain hash digest of block 80 [current block]) |

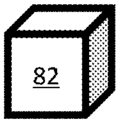

| | |
|---|---|
| FILE BLOCKCHAIN BLOCK 82 | INFORMATION IN BLOCK:<br>*Blockchain Data: Message<br>*Blockchain Metadata: Metadata wrapper 100 (blockchain hash digest of block 80 [prior block] and blockchain hash digest of block 82 [current block]) |

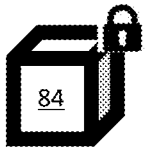

| | |
|---|---|
| LOOP BLOCKCHAIN LOCK BLOCK 84 | INFORMATION IN BLOCK:<br>*Blockchain Data: Message; ledger listing all blockchain blocks in the blockchain segment<br>*Blockchain Metadata: Metadata wrapper 100 (blockchain hash digest of block 82 [final data block of track 64]; blockchain hash digest of block 78 [genesis block of track 64]; and blockchain hash digest of block 84 [lock block]) |

FIG. 17

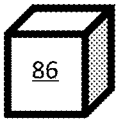

| | |
|---|---|
| FILE BLOCKCHAIN BLOCK 86 | INFORMATION IN BLOCK:<br>*Blockchain Data: Message<br>*Blockchain Metadata: Metadata wrapper 100 (blockchain hash digest of block 82 [prior block] and blockchain hash digest of block 86 [current block]) |

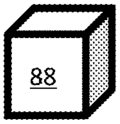

| | |
|---|---|
| FILE BLOCKCHAIN BLOCK 88 | INFORMATION IN BLOCK:<br>*Blockchain Data: Message<br>*Blockchain Metadata: Metadata wrapper 100 (blockchain hash digest of block 86 [prior block] and blockchain hash digest of block 88 [current block]) |

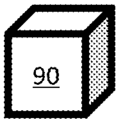

| | |
|---|---|
| FILE BLOCKCHAIN BLOCK 90 | INFORMATION IN BLOCK:<br>*Blockchain Data: Message<br>*Blockchain Metadata: Metadata wrapper 100 (blockchain hash digest of block 88 [prior block] and blockchain hash digest of block 90 [current block]) |

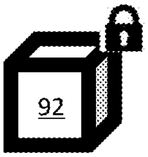

| | |
|---|---|
| LOOP BLOCKCHAIN LOCK BLOCK 92 | INFORMATION IN BLOCK:<br>*Blockchain Data: Message; ledger listing all blockchain blocks in the blockchain segment<br>*Blockchain Metadata: Metadata wrapper 100 (blockchain hash digest of block 90 [final data block of track 66]; blockchain hash digest of block 86 [genesis block of track 66]; and blockchain hash digest of block 92 [lock block]) |

FIG. 18

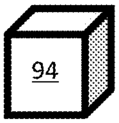

| | |
|---|---|
| FILE BLOCKCHAIN BLOCK 94 | INFORMATION IN BLOCK:<br>*Blockchain Data: Message<br>*Blockchain Metadata: Metadata wrapper 100 (blockchain hash digest of block 90 [prior block] and blockchain hash digest of block 94 [current block]) |

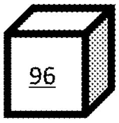

| | |
|---|---|
| FILE BLOCKCHAIN BLOCK 96 | INFORMATION IN BLOCK:<br>*Blockchain Data: Message<br>*Blockchain Metadata: Metadata wrapper 100 (blockchain hash digest of block 94 [prior block] and blockchain hash digest pair of block 96 [current block]) |

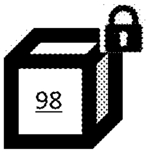

| | |
|---|---|
| LOOP BLOCKCHAIN LOCK BLOCK 98 | INFORMATION IN BLOCK:<br>*Blockchain Data: Message; ledger listing all blockchain blocks in the blockchain segment<br>*Blockchain Metadata: Metadata wrapper 100 (blockchain hash digest of block 96 [final data block of track 68]; blockchain hash digest of block 94 [genesis block of track 68]; and blockchain hash digest of block 98 [lock block]) |

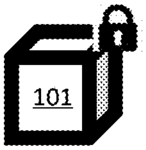

| | |
|---|---|
| LOOP BLOCKCHAIN LOCK BLOCK 101 | INFORMATION IN BLOCK:<br>*Blockchain Data: Message; ledger listing all blockchain blocks in the entire blockchain<br>*Blockchain Metadata: Metadata wrapper 100 (blockchain hash digest of block 96 [final data block of file 61]; blockchain hash digest of block 70 [genesis block of file 61]; and blockchain hash digest of block 101 [lock block]) |

FIG. 19

| Blockchain Lock Block Ledger Table 104 | | | |
|---|---|---|---|
| Blockchain Block ID Number 106 | Hash Digest Types 108 | Hash Digests 110 | Data Contents (file names) 112 |
| LOOP BLOCKCHAIN GENESIS BLOCK 22 | MD5, SHA-1, SHA-224, SHA-512/224, SHA-256, SHA-512/256, SHA-384, SHA-512, or SHA-3 | 79054025 255FB1A2 6E4BC422 AEF54EB4 | SPREADSHEET FINANCIAL RECORDS |
| LOOP BLOCKCHAIN DATA BLOCK 24 | MD5, SHA-1, SHA-224, SHA-512/224, SHA-256, SHA-512/256, SHA-384, SHA-512, or SHA-3 | 1FE11FD0 8C5AADC2 B70059FB 097C4433 | PDF |
| LOOP BLOCKCHAIN DATA BLOCK 24 | MD5, SHA-1, SHA-224, SHA-512/224, SHA-256, SHA-512/256, SHA-384, SHA-512, or SHA-3 | 79054025 255FB1A2 6E4BC422 AEF54EB4 | MEDIA, GOP, MP3 |
| TERMINATING LOOP BLOCKCHAIN DATA BLOCK (LAST DATA BLOCK) 28 | MD5, SHA-1, SHA-224, SHA-512/224, SHA-256, SHA-512/256, SHA-384, SHA-512, or SHA-3 | 3573EA2B BB9AEF10 2E7C236A 66B8028D | MEDICAL RECORDS |
| LOOP BLOCKCHAIN LOCK BLOCK 30 | MD5, SHA-1, SHA-224, SHA-512/224, SHA-256, SHA-512/256, SHA-384, SHA-512, or SHA-3 | 6C919C63 4DCAD6EA B5F84365 13E3288D | DATA LEDGER OF ALL BLOCKCHAIN BLOCKS 104 |

FIG. 20

LOCKING BLOCKCHAIN BLOCKS FOR DATA SECURITY FOR FINITE LENGTH BLOCKCHAINS

FIELD OF THE INVENTION

The present invention relates to the field of blockchain technologies and more particularly to a blockchain technology for providing additional tamper-resistant security for blockchains of finite lengths.

BACKGROUND OF THE SPECIFICATION

A blockchain is a continuously growing list of records, called blocks, which are linked and secured using cryptography. Each block typically contains a cryptographic hash of the previous block and itself, a timestamp, and transaction data. By design, a blockchain is inherently resistant to modification of the data. It is an open, distributed ledger that can record transactions between two parties efficiently and in a verifiable and secure way. For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. Blockchains are secure by design and are an example of a distributed computing system with high Byzantine fault tolerance. Decentralized consensus has therefore been achieved with a blockchain. This feature makes blockchains potentially suitable for the recording of events, medical records, and other records management activities, such as identity management, transaction processing, documenting provenance, food traceability, or voting. The first work on a cryptographically secured chain of blocks was described in 1991 by Stuart Haber and W. Scott Stornetta. In 1992, Bayer, Haber, and Stornetta incorporated Merkle trees to the design, which improved its efficiency by allowing several documents to be collected into one block. In general, blockchains are a growing list of blockchain blocks that have no end. Blockchains, particularly in cryptocurrency applications, are intended to extend indefinitely without end to accommodate further cryptocurrency transactions that are recorded in new blockchain blocks that are added to the blockchain. As these crypto-currency based blockchains are constructed to continue indefinitely, there always is a blockchain block at the end of the blockchain to which new blockchain blocks may be attached. However, these cryptocurrency based blockchains do not have a blockchain block that terminates the blockchain preventing other blockchain blocks from being attached to it.

SUMMARY OF THE SPECIFICATION

The present specification discloses a blockchain having a finite number of blockchain blocks secured in a loop with a locking blockchain block executed by instructions stored on a non-volatile computer tangible medium. The blockchain has a genesis blockchain block and a terminating blockchain block that ends the blockchain. The blockchain also has a blockchain lock block that includes a hash digest based on a hash digest from the genesis blockchain block and a hash digest from the terminating blockchain block. The blockchain lock block logically locks the genesis blockchain block to the terminating blockchain block forming the blockchain into a loop by cryptographically linking the genesis blockchain block to the terminating blockchain block, thereby preventing the addition of new blockchain blocks in the blockchain. The blockchain has a finite number of blockchain blocks connecting the genesis blockchain block to the terminating blockchain block, wherein the blockchain lock block is added to the blockchain after the terminating blockchain block, thereby preventing the addition of new blockchain blocks in the blockchain. The blockchain lock block includes the hash digest from the genesis blockchain block and the hash digest from the terminating blockchain block. Multiple blockchain lock blocks are used to secure separate portions of a data file that is stored across multiple physical mediums using volume spanning. One blockchain lock block is used to secure one portion of the data file that is stored on one of the multiple physical mediums. A Merkle tree secures the multiple blockchain lock blocks together to logically link all the separate portions of the data file stored on the multiple physical mediums together into the data file. Multiple blockchains are stored on a single storage medium using volume stacking, wherein each blockchain is separately secured into a loop using one blockchain lock block. The blockchain lock blocks for each blockchain on the single storage medium are linked together via a Merkle tree for the single storage medium. The blockchain lock blocks are used with blockchained files stored on magnetic tape according to an ECMA magnetic tape serpentine data format. A blockchain lock block is used to separately secure each portion of a file stored on a separate data track of the magnetic tape. The blockchain lock block includes a ledger identifying the genesis blockchain block, the terminating blockchain block, and all blockchain blocks linking the genesis blockchain block to the terminating blockchain block.

The present specification also discloses a non-volatile computer medium storing instructions for a blockchain method for securing finite length blockchain records. The medium includes instructions for a blockchain having a finite number of blockchain blocks. The blockchain also has a blockchain lock block that includes a hash digest based on a hash digest from a first blockchain block starting the blockchain and a hash digest from the last blockchain block ending the blockchain, thereby directly blockchaining the first blockchain block to the last blockchain block forming a blockchain loop. The blockchain lock block includes hashes from the first blockchain block and the last blockchain block, wherein the blockchain lock block links the first blockchain block to the last blockchain block, thereby forming the blockchain into a cryptographic loop. The blockchain lock block has a ledger identifying all of the blockchain blocks in the blockchain. Multiple blockchain lock blocks are used to secure separate portions of a data file that is stored across multiple physical mediums using volume spanning. A Merkle tree secures the multiple blockchain lock blocks together to logically link all the separate portions of the data file stored on the multiple physical mediums together into the data file. Multiple blockchains are stored on a single storage medium using volume stacking. Each blockchain is separately secured into a loop using one blockchain lock block. The blockchain lock blocks for each blockchain on the single storage medium are linked together via a Merkle tree for the single storage medium.

The present specification also discloses a non-volatile computer medium storing instructions for a blockchain method for securing finite length blockchain records into a loop to prevent further blockchain blocks from being added to it. The blockchain has a genesis blockchain block and a terminating blockchain block that ends the blockchain. The blockchain also has a blockchain lock block that is hashed to both the genesis blockchain block and the terminating blockchain block, thereby locking the terminating blockchain block to the genesis blockchain block through cryptographic hashing. The blockchain lock block has a ledger identifying all blockchain blocks in the blockchain including the genesis blockchain block and terminating blockchain block. The blockchain lock block includes a hash digest based on a hash digest from the genesis blockchain block and a hash digest from the terminating blockchain block. The blockchain lock block also includes a hash digest from the genesis blockchain block and a hash digest from the terminating blockchain block. The blockchain lock block cryptographically hashes the terminating blockchain block to the genesis blockchain block preventing new blockchain blocks being added to the blockchain.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

FIG. 3 illustrates a finite loop blockchain locked with a blockchain lock block along with data tables for each of the blockchain blocks listing the data contents of each block;

FIGS. 16-19 illustrate data tables for each of the blockchain blocks depicting the data contents of each blockchain block shown in the ECMA magnetic tape serpentine data format of FIG. 15; and FIG. 20 illustrates a blockchain lock block ledger table that contains an inventory of the blockchain blocks forming the blockchain.

DETAILED DESCRIPTION OF THE SPECIFICATION

While the invention has been shown and described with reference to a particular embodiment thereof, it will be understood to those skilled in the art, that various changes in form and details may be made therein without departing from the spirit and scope of the invention.

Figure 1:
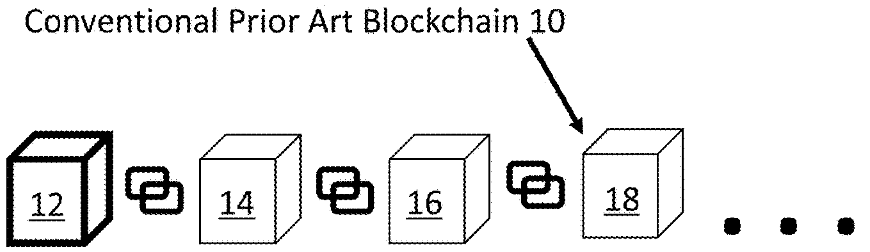
FIG. 1 (PRIOR ART)
FIG. 1 illustrates a conventional prior art blockchain.

FIG. 1 illustrates a conventional prior art blockchain 10. Conventional prior art blockchain 10 begins with a genesis blockchain block 12. Genesis blockchain block 12 is followed by three additional blockchain blocks 14, 16, and 18. Genesis blockchain block 12, as the first blockchain block that begins blockchain 10, includes data and a hash digest of itself. Blockchain block 14 includes the hash digest from genesis block 12, data, and a hash of itself. Blockchain block 16 includes the hash digest from blockchain block 14, data, and a hash of itself. Blockchain block 18 includes the hash digest from blockchain block 16, data, and a hash of itself. The three dots after blockchain block 18 indicate that blockchain 10 continues on indefinitely. While blockchain 10 has a first blockchain block, genesis blockchain block 12, blockchain 10 has no end. Blockchain 10 is conceptually an infinitely long blockchain without end. Blockchain block 18 is not the final blockchain block in blockchain 10. Blockchain block 18 is merely the most recently added blockchain block that is the last one added to blockchain 10, until another blockchain block is added. Blockchains 10 that continue on indefinitely are useful for crypto-currency applications in which individuals can transact currency ad infinitum. While currency transaction records and other various records can continue without end, other records are finite.

Figure 2:
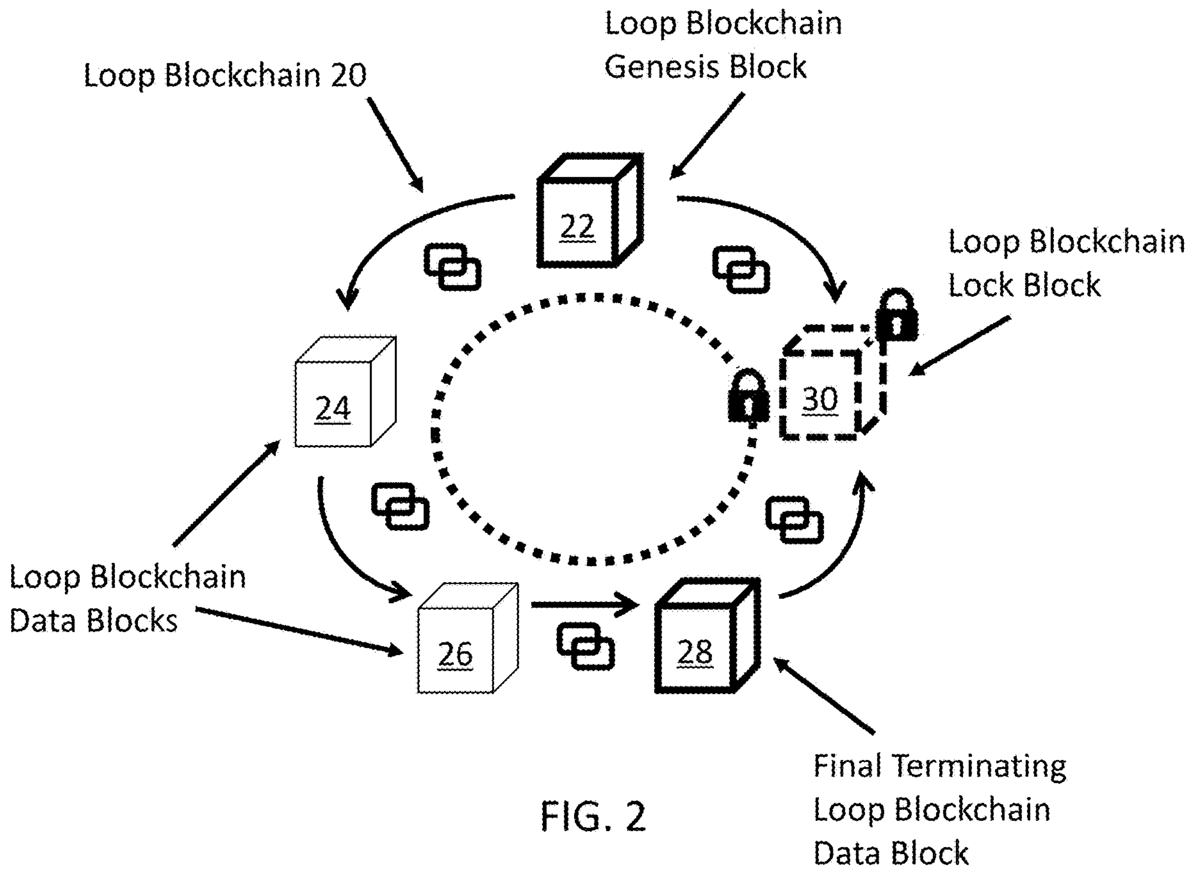
FIG. 2 illustrates a finite loop blockchain locked with a blockchain lock block for added data security.

FIG. 2 illustrates a finite loop blockchain 20 locked with a blockchain lock block 30 for added data security according to the present invention. Blockchain 20 is a finite blockchain, meaning that it has a finite number of blockchain blocks attached to it. A vast number of record types are finite in length. Most records are discrete in length. School transcripts, medical records, tax records, many financial records, manufacturing records, legal records, property records, executable files, movies, songs, media, and other records are generally discrete and finite in length. Storing these records of finite length in a blockchain will produce a blockchain of finite length. It is desirable to secure this blockchain of finite length in a way to improve the data integrity and prevent the addition of further blockchain blocks to the finite record. Finite blockchain 20 begins with a genesis blockchain block 22 that is the first blockchain block in the blockchain. Blockchain blocks 24 and 26 are additional data records blockchained to genesis blockchain block 22. Blockchain block 28 is the final blockchain block in the data blockchain that terminates the blockchain. Blockchain block 28 is the last data record in finite blockchain 20. In order to provide additional cryptographic data security to finite blockchain 20, blockchain lock block 30 is added to finite blockchain 20. Blockchain lock block 30 cryptographically hashes genesis blockchain block 22 to the final terminating blockchain block 28, thereby forming the finite blockchain into a blockchain loop. Finite blockchain 20 is therefore also referred to as a loop blockchain 20, or a finite loop blockchain 20. The first and last data blockchain blocks 22 and 28 in finite blockchain 20 are depicted as a box having thick lines. Blockchain blocks 24 and 26 that interconnect the first and last blockchain blocks 22 and 28 are shown by boxes having thinner lines. The blockchain lock block 30 is represented by a box having dashed lines along with a padlock symbol to denote that the blockchain lock block 30 cryptographically hashes the first and last blockchain blocks 22 and 28 together. The dashed circle in the center of loop blockchain represents that the finite loop blockchain 20 is formed cryptographically into a loop. The genesis blockchain block 22 includes just a hash of itself as it is the first blockchain block. Blockchain block 24 includes the hash digest from genesis blockchain block 22 as well as a hash of itself. Blockchain block 26 includes the hash digest from blockchain block 24 as well as a hash of itself. Blockchain block 28 includes the hash digest from blockchain block 26 as well as a hash of itself. Genesis blockchain block 22 is the only blockchain block that has a hash digest based only on itself and not from any other blockchain block. Blockchain blocks 24, 26, and 28 each include a hash digest from the previous blockchain block. In a conventional blockchain, each blockchain block after the genesis blockchain block contains a hash digest from the previous blockchain block. According to the present invention, blockchain lock block 30 includes a hash digest from genesis blockchain block 22 and a hash digest from the final terminating blockchain block 28. The hash of blockchain lock block 30 is therefore based not on just the preceding blockchain block 28, but also genesis blockchain block as well. By having the blockchain lock block 30 contain hash digests from the genesis blockchain block 22 and final blockchain block 28, blockchain 20 is formed into a cryptographic loop. With blockchain lock block 30 having a hash digest based on the hash digests of genesis blockchain block 22 and final blockchain block 28, the chain of cryptographic hashes is linked back to the genesis blockchain block 22 preventing the addition of new blockchain blocks to blockchain 20 that continue a conventional progression of newly added blockchain blocks having a hash digest based on just the previous blockchain block all of the way back to the genesis blockchain block. Blockchain lock block 30 therefore provides enhanced data security to finite blockchain 20 by cryptographically hashing first and last blockchain blocks 22 and 28 of finite blockchain 20 together into a loop that prevents the addition of new blockchain blocks to finite blockchain 20 because lock block 30 has a hash digest based on more than just the previous blockchain block. The presence of blockchain lock block 30 breaks the cryptographic hash continuity of cryptographically hashing to the previous blockchain block in the blockchain only. Thus, blockchain lock block 30 interrupts the cryptographic hash continuity of blockchain 20 preventing further blockchain blocks from continuing the cryptographic hash continuity from blockchain block 28, thereby enhancing data security.

FIG. 3 illustrates a finite loop blockchain 20 locked with a blockchain lock block 30 along with data tables for each of the blockchain blocks 22, 24, 26, 28, and 30 listing the data contents of each block. Finite loop blockchain 20 is depicted as having five blockchain blocks 22, 24, 26, 28, and 30. The depiction of five blockchain blocks 22, 24, 26, 28, and 30 is merely exemplary. Finite loop blockchain 20 will always have a genesis blockchain block 22 and a final data blockchain block 28 that terminates blockchain. Finite loop blockchain 20 is then locked with blockchain lock block 30. However, the use of two interconnecting blockchain blocks 24 and 26 is merely exemplary. Any number of interconnecting blockchain blocks that connect genesis blockchain block 22 to final terminating blockchain block 28 may be used in combination with blockchain lock block 30. Genesis blockchain block 22 includes a message as data as well as a metadata wrapper 100 that includes a hash digest of block 22. Blockchain data block 24 includes a message or information as data as well as a metadata wrapper 100 that includes a hash digest of block 22 and a hash digest of block 24. Metadata wrapper 100 is a generic blockchain metadata wrapper that includes hash digests, information on the hash digests such as the type of hash algorithm used to make the hash digests, and information about the blockchain block. The metadata wrapper 100 may include one hash digest for the genesis blockchain block, two hash digests for conventional blockchain blocks appended to the genesis blockchain block, or three hash digests for the blockchain lock block. The information about the blockchain block may include an identifier for the blockchain block and a type of data contained within the blockchain block as well as a file name of the data contained within the blockchain block. Blockchain data block 26 includes a message or information as data as well as a metadata wrapper 100 that includes a hash digest of block 24 and a hash digest of block 26. Final blockchain data block 28 includes a message or information as data as well as a metadata wrapper 100 that includes a hash digest of block 26 and a hash digest of block 28. Blockchain lock block 30 includes a ledger, shown in FIG. 20 as ledger 104, listing all blockchain blocks in the blockchain as well as information about those blockchain blocks. That information may include hash digests from each of those blockchain blocks, the type of hash algorithm used to form those hash digests, as well as information about the data contents of each blockchain block. Blockchain lock block 30 also includes a metadata wrapper 100 that includes a hash digest of genesis blockchain block 22, final terminating blockchain block 28, as well as a hash digest of lock block 30. If blockchain lock block 30 were a conventional blockchain block, it would not include a hash digest from genesis blockchain block 22. The ledger may be included within the metadata wrapper 100.

Figure 4:
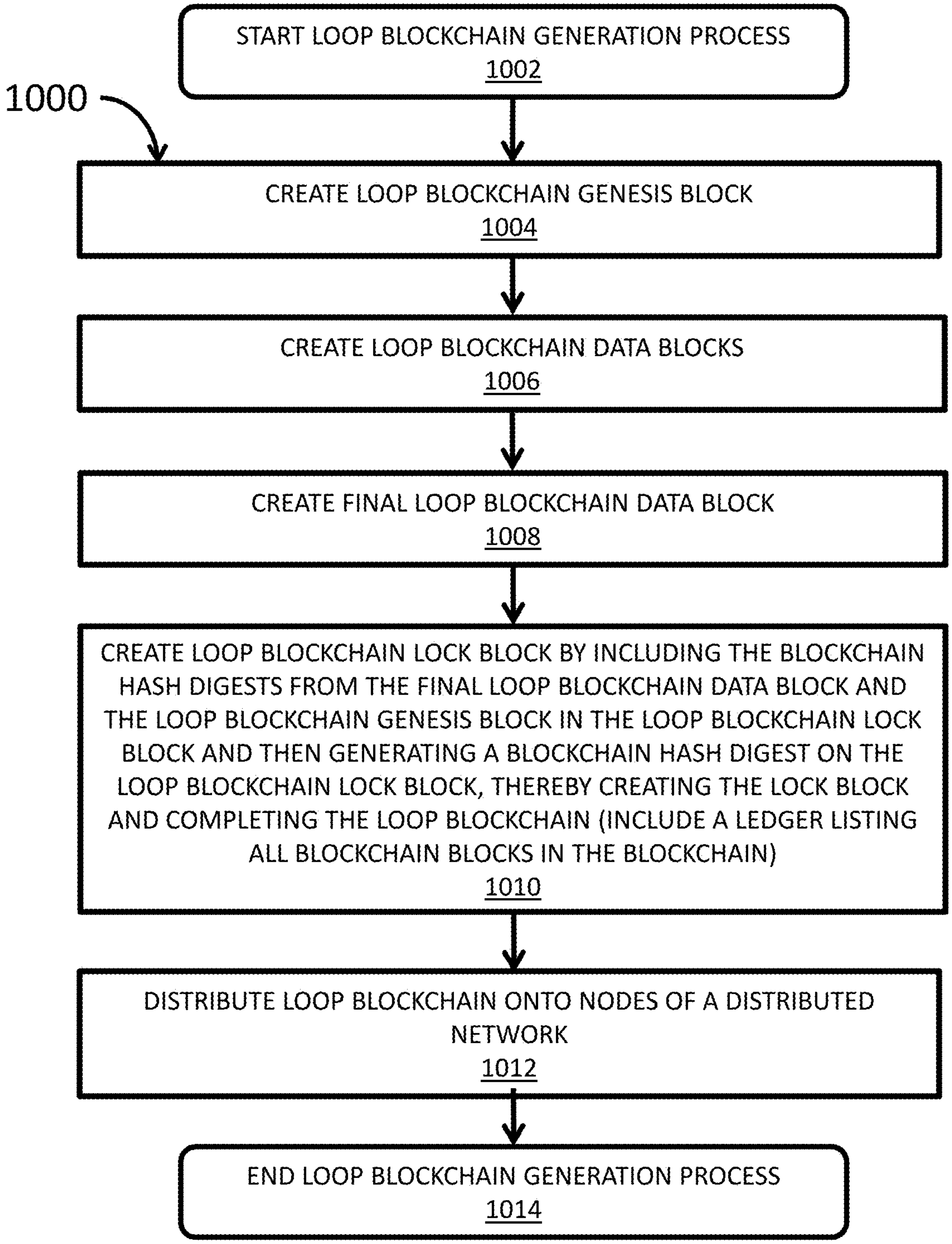
FIG. 4 illustrates a flowchart depicting a process for generating a finite loop blockchain with a locking blockchain block for data security.

FIG. 4 illustrates a flowchart 1000 depicting a process for generating a finite loop blockchain 20 with a locking blockchain block 30 for data security. The process begins with START in step 1002. In step 1004, a blockchain genesis block 22 is created. In step 1006, data blockchain blocks 24 and 26 are created. In step 1008, the final terminating data blockchain block 28. The final terminating data blockchain block 28 is the last data blockchain block in blockchain 20. In step 1010, the blockchain lock block 30 is generated by including the blockchain hash digests from both the genesis blockchain block 22 and the final data blockchain block 28. The hash digest of blockchain lock block 30 is generated based on the genesis blockchain block 22 and the final data blockchain block 28 as well as the ledger and other information contained within the lock block 30. By including the hash digests for both the first and last blockchain blocks 22 and 28 in blockchain 20, lock block 30 cryptographically locks the two ends of blockchain 20 together like a pad lock on an actual chain. In step 1012, blockchain 20 including blockchain lock block 30 is distributed onto the nodes of a distributed network. With blockchain lock block 30 having a hash digest based on the hash digests of genesis blockchain block 22 and final blockchain block 28, the chain of cryptographic hashes is linked back to the genesis blockchain block 22 preventing the addition of new blockchain blocks to blockchain 20. Blockchain lock block 30 therefore provides enhanced data security to finite blockchain 20 by cryptographically hashing first and last blockchain blocks 22 and 28 of finite blockchain 20 together into a loop that prevents the addition of new blockchain blocks to finite blockchain 20 because lock block 30 has a hash digest based on more than just the previous blockchain block. The presence of blockchain lock block 30 breaks the cryptographic hash continuity of cryptographically hashing to the previous blockchain block in the blockchain only. In conventional blockchains, there is a continuous linkage of hash digests between blockchain blocks where each blockchain block includes a hash digest from the previous blockchain block all the way back to the genesis blockchain block, which as the first blockchain block has a hash digest of itself only. Blockchain lock block 30 interrupts the cryptographic hash continuity of blockchain 20 by including hash digests from both the previous blockchain block 28 and genesis blockchain block 22, thereby preventing further blockchain blocks from continuing the cryptographic hash continuity of from blockchain block 28, which provides enhanced data security. This breaking of the cryptographic hash continuity prevents new blockchain blocks from being added to blockchain 20 after lock block 30 that continue a conventional progression of new blockchain blocks having a hash digest based on just the previous blockchain block. A ledger 104 listing all of the blockchain blocks contained within the finite loop blockchain is generated and stored within blockchain lock block 30. The process ENDS with step 1014.

Figure 5:
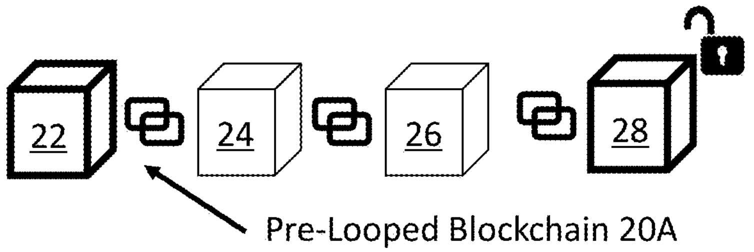
FIG. 5 illustrates a finite length blockchain in a pre-locked state.

FIG. 5 illustrates a finite length blockchain in a pre-locked state 20A. Unlocked blockchain 20A includes genesis blockchain block 22, final terminating blockchain block 28, and interconnecting blockchain blocks 24 and 26. The last blockchain block 28 is shown having an unlocked padlock icon indicating that a blockchain lock block 30 had not yet been applied to blockchain 20A. As blockchain lock block 30 had not yet been applied to blockchain 20A, blockchain 20A is not looped. Thus, blockchain 20A is in a pre-looped state. In this pre-looped state, genesis block 22 has a hash digest of itself only. As there is no blockchain block before genesis block 22, genesis blockchain block 22 includes a hash of itself only. However, succeeding blockchain blocks 24, 26, and 28 are all linked back to genesis blockchain block 22 through interlinking hash digests. Succeeding blockchain blocks 24, 26, and 28 all have a hash digest from the previous blockchain blocks 22, 24, and 26 respectively, as well as a hash digest based on itself that gets incorporated into the next blockchain block in the blockchain 20A. This usage of a hash digest from previous blockchain blocks, which then gets incorporated into the hash digest for the succeeding blockchain block provides cryptographic hash continuity in blockchain 20A. In a conventional blockchain 10 as shown in FIG. 1, this continuity of using a hash digest from previous blockchain blocks, which then gets incorporated into the hash digest for the succeeding blockchain block, continues on in perpetuity without alteration as there is no end to the blockchain. However, the blockchain 20A is not configured to continue on into perpetuity as it will store a finite record, such as a single tax return for one tax year, a set of medical records for one patient, one academic record for a particular student, or other record, records, or discrete data set that has a finite length, for example. Thus, at some point, in storing discrete records or data of a finite length, blockchain 20A will reach a terminating final blockchain block 28 that is the last blockchain block in blockchain 20A. In FIG. 5, terminating final blockchain block 28 is reached after two interconnecting blockchain blocks 24 and 26. However, any finite number of interconnecting blockchain blocks may be used in combination with a finite length blockchain 20A. As blockchain 20A is of finite length, it is desirable to secure the end of blockchain 20A using cryptographic hashes to prevent the addition of further blockchain blocks, which would thereby alter the file stored in blockchain 20A. Blockchain lock block 30 secures unlocked pre-looped blockchain 20A into a secure locked loop blockchain 20 shown in FIG. 6 by incorporating not only the blockchain hash digest from the terminating final data blockchain block 28, but by also incorporating the hash digest from the genesis blockchain block 22, thereby linking the first and last blockchain blocks in blockchain 20A together. This incorporation of the genesis blockchain block 22 hash digest breaks the cryptographic hash digest continuity of incorporating the hash digest from just the prior blockchain block, thereby preventing any further blockchain blocks added after blockchain lock block 30 from perpetuating this cryptographic hash digest continuity. Thus, new blockchain blocks cannot be added to blockchain 20 after blockchain lock block 30 is added to the blockchain 20.

Figure 6:
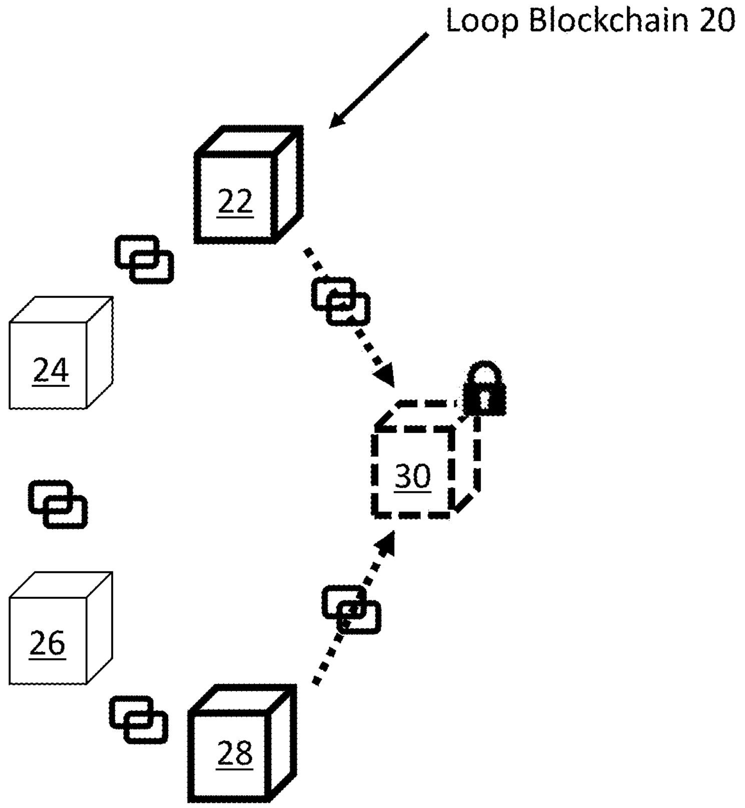
FIG. 6 depicts the conversion of a finite length blockchain from being in a pre-locked state into a locked loop blockchain.

FIG. 6 depicts the conversion of a finite length blockchain from being in a pre-locked state 20A into a locked loop blockchain 20. Blockchain lock block 30 is cryptographically hashed to the terminating final blockchain block 28 as well as the genesis blockchain block 22, thereby forming loop of cryptographic hashes binding the first and last blockchain blocks of blockchain 20A together into a locked loop blockchain 20. As can be seen in FIG. 6, there is a cryptographic hash link between blockchain lock block 30 with genesis blockchain block 22 as well as final terminating blockchain block 28. The closed padlock symbol on blockchain lock block 30 indicates that blockchain lock block 30 has cryptographically locked the ends of blockchain 20A together into a looped blockchain 20.

Figure 7:
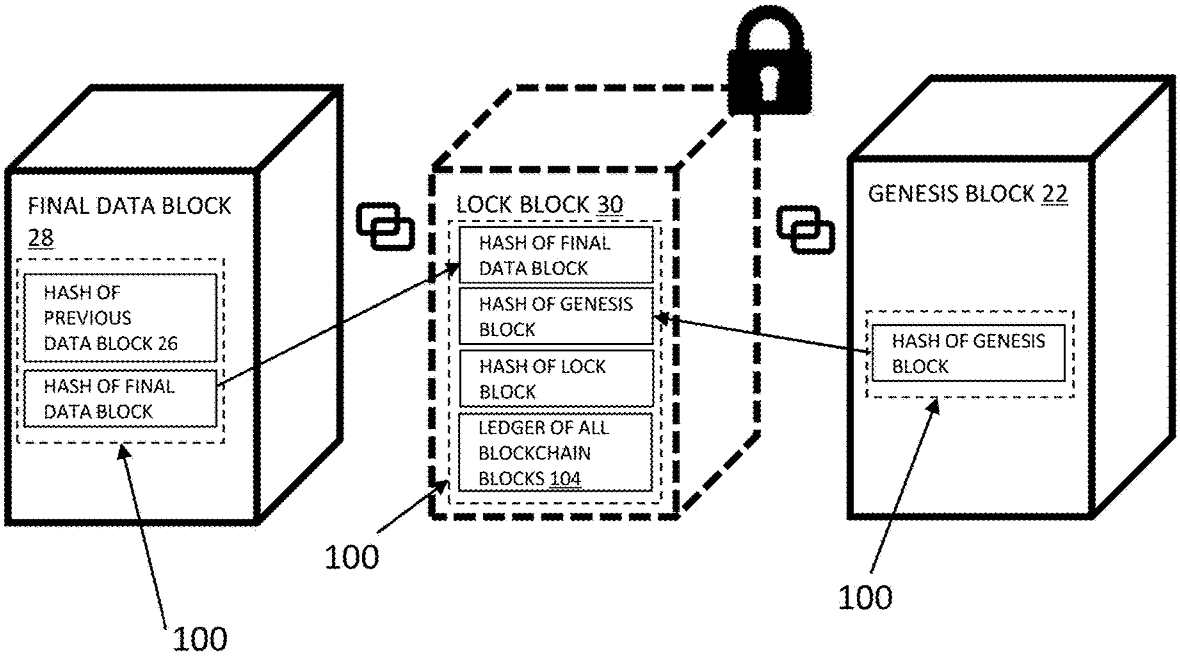
FIG. 7 depicts the genesis blockchain block and final data blockchain block of a blockchain and how their hash digests are incorporated into a locking blockchain block, also called a lock block.

FIG. 7 depicts the genesis blockchain block 22 and final terminating data blockchain block 28 of a blockchain 20 and how their hash digests are incorporated into a locking blockchain block 30, also called a blockchain lock block 30. Genesis blockchain block 22, as the first blockchain block, contains a hash digest of itself only, which is contained in metadata wrapper 100. The terminating final data blockchain block 28 includes a hash of itself, but also the hash digest from the previous blockchain block 26, which is contained in metadata wrapper 100. Blockchain lock block 30 includes both the hash digest from the genesis blockchain block 22 as well as the hash digest of the terminating final blockchain block 28, which are contained within metadata wrapper 100. Blockchain lock block 30 then also includes a hash digest of itself that is based on the hash digest from the genesis blockchain block 22 as well as the hash digest of the terminating final blockchain block 28, which is contained within metadata wrapper 100. This creation of the hash digest for blockchain lock block 30 based on both the hash digest from the genesis blockchain block 22 as well as the hash digest of the terminating final blockchain block 28 terminates the continuity of perpetuating hash digests to just the next blockchain block, thereby preventing the blockchain from having new blockchain blocks added that maintains conventional hash digest continuity back to the genesis blockchain block 22. Blockchain lock block 30 also includes a ledger 104 of all blockchain blocks contained within blockchain 20, which is contained within metadata wrapper 100. This ledger 104 is shown in detail in FIG. 20. The ledger 104 may include a listing of all blockchain blocks contained within blockchain 20. The ledger 104 may include a listing of the identifiers for all blockchain blocks contained within blockchain 20 as well as the type of hash digest algorithm used for each of the blockchain blocks within blockchain 20. The ledger 104 may include a listing of the hash digest for each of the blockchain blocks for blockchain 20. The ledger 104 may also include a listing of the data contents for each of the blockchain blocks in blockchain 20, such as the type of data, file type, or file names.

Figure 8:
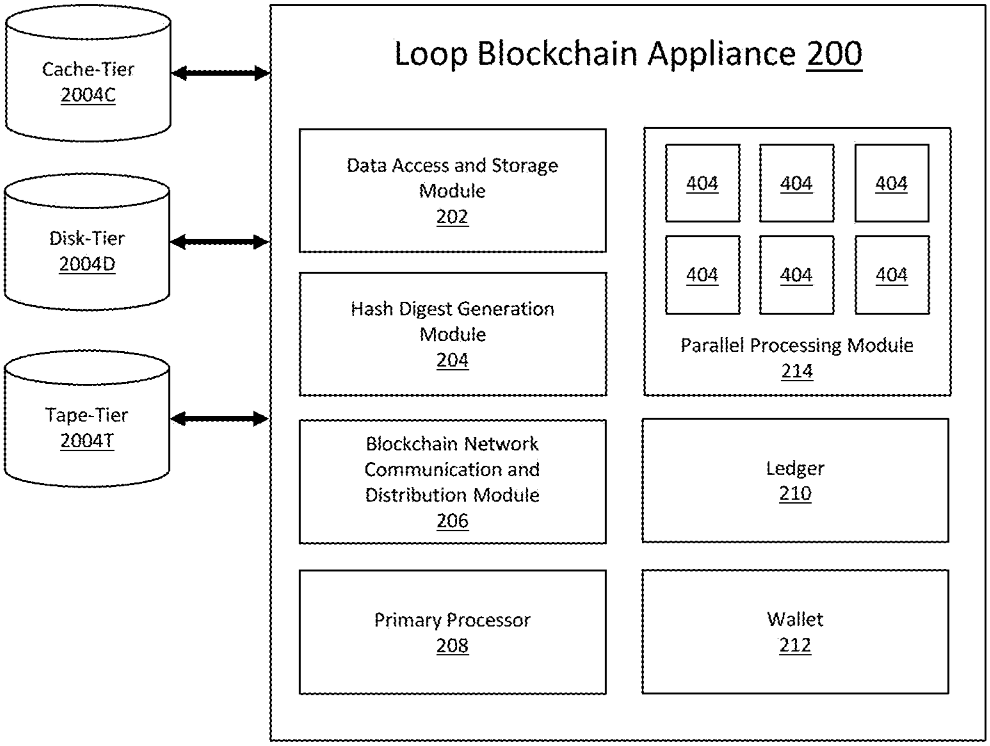
FIG. 8 illustrates a block diagram of a locked loop blockchain appliance coupled to tiered storage.

FIG. 8 illustrates a block diagram of a locked loop blockchain appliance 200 coupled to tiered storage 2004C, 2004D, and 2004T. Appliance 200 is a hardware device that executes software to create locked loop blockchains 20 that includes blockchain lock block 30. Appliance 200 includes a data access and storage module 202 that is used to access data, such as files and records, that are stored within the blockchain blocks of blockchain 20. Data access and storage module 202 allows for appliance 200 to read and write data that is incorporated into blockchain 20. The data and files accessed by data access and storage module 202 is stored on tiered storage in bidirectional communication with the tiered storage. Tiered storage includes a cache storage tier 2004C, a disk storage tiered 2004D, and a tape storage tier 2004T. Hash digest generation module 204 creates the hash digests for each blockchain block in blockchain 20 utilizing the hash digest cores 404 in parallel processing module 214. Utilizing the data accessed with module 202 and the hash digests created with module 204, appliance 200 creates blockchain blocks in blockchain 20 and distributes them to various network nodes utilizing blockchain network and communication and distribution module 206 for storage. Appliance 200 includes a primary processor 208 containing software instructions for executing the processes for creating blockchain 20 and blockchain lock block 30, such as process 1000. Appliance 200 includes a ledger 210 for recording the blockchain transactions used in generating the blockchain blocks of blockchain 20. Appliance 200 also includes a wallet for storing various passwords, payment information, and other security information related to the access of data, as well as the generation and distribution of blockchain 20.

Figure 9:
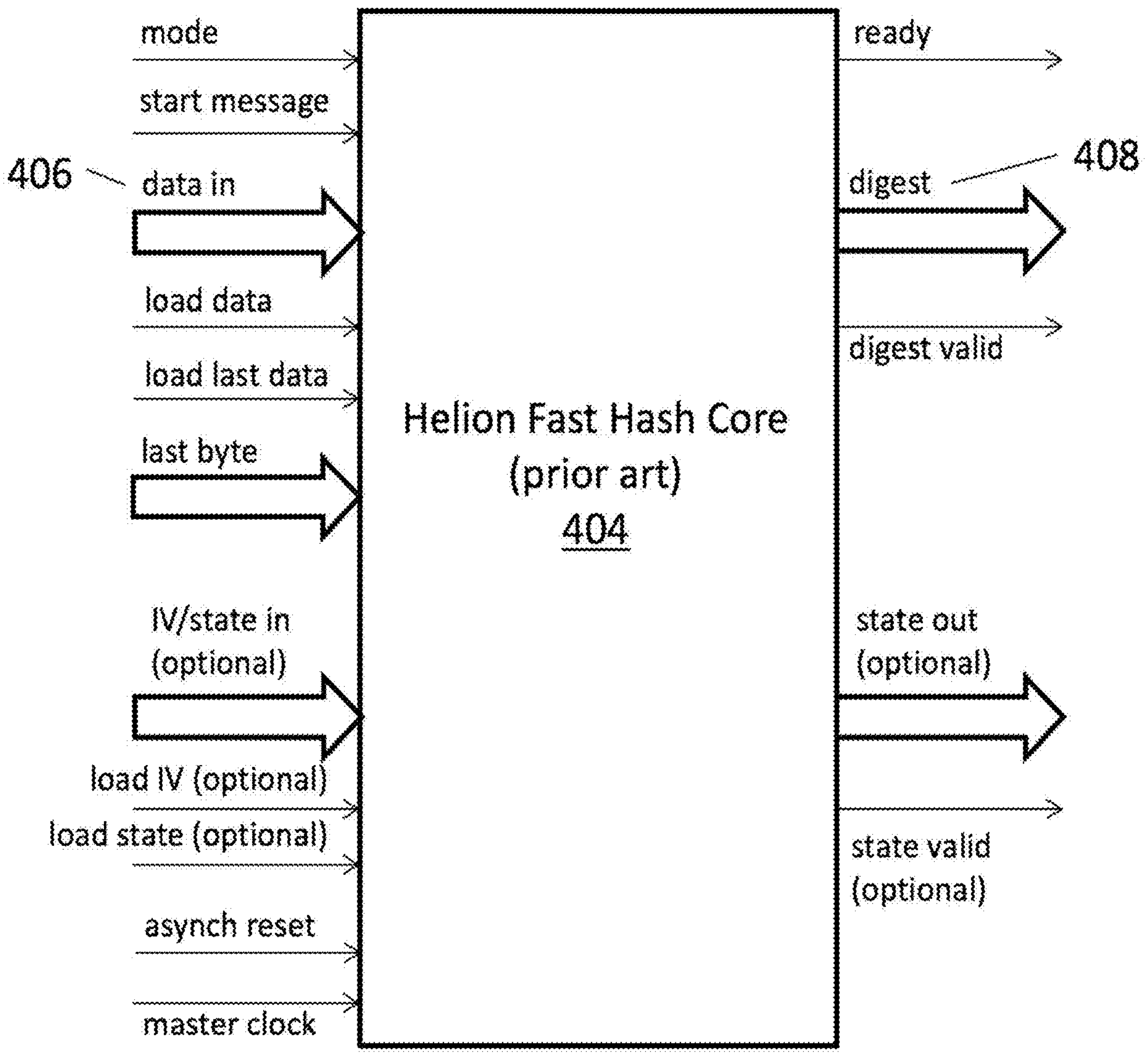
FIG. 9 illustrates a block diagram of a Helion fast hash core processor.

FIG. 9 illustrates a block diagram of a Helion fast hash core processor 404, which is a part of parallel processing module 214 shown in FIG. 8. Helion Fast Hash Core Application Specific Integrated Circuit (ASIC) 404, which may be resident in processor 208, is one exemplary chip for generating hash digests used to create blockchain 20. The Helion Fast Hash Core family implements the NIST approved SHA-1, SHA-224, SHA-256, SHA-384 and SHA-512 secure hash algorithms to FIPS 180-3 and the legacy MD5 hash algorithm to RFC 1321. These are high performance cores that are available in single or multi-mode versions and have been designed specifically for ASIC. Data to be blockchained into a blockchain 20 is fed into this ASIC at 406 and the resulting blockchain hash digest output is 408. Such dedicated hash core ASICs have faster performance than software running in a cloud, or computer memory under an operating system. One hash core 404 may be used with appliance 200. However, the use of multiple cores 404 affords for faster processing through parallel processing.

Figure 10:
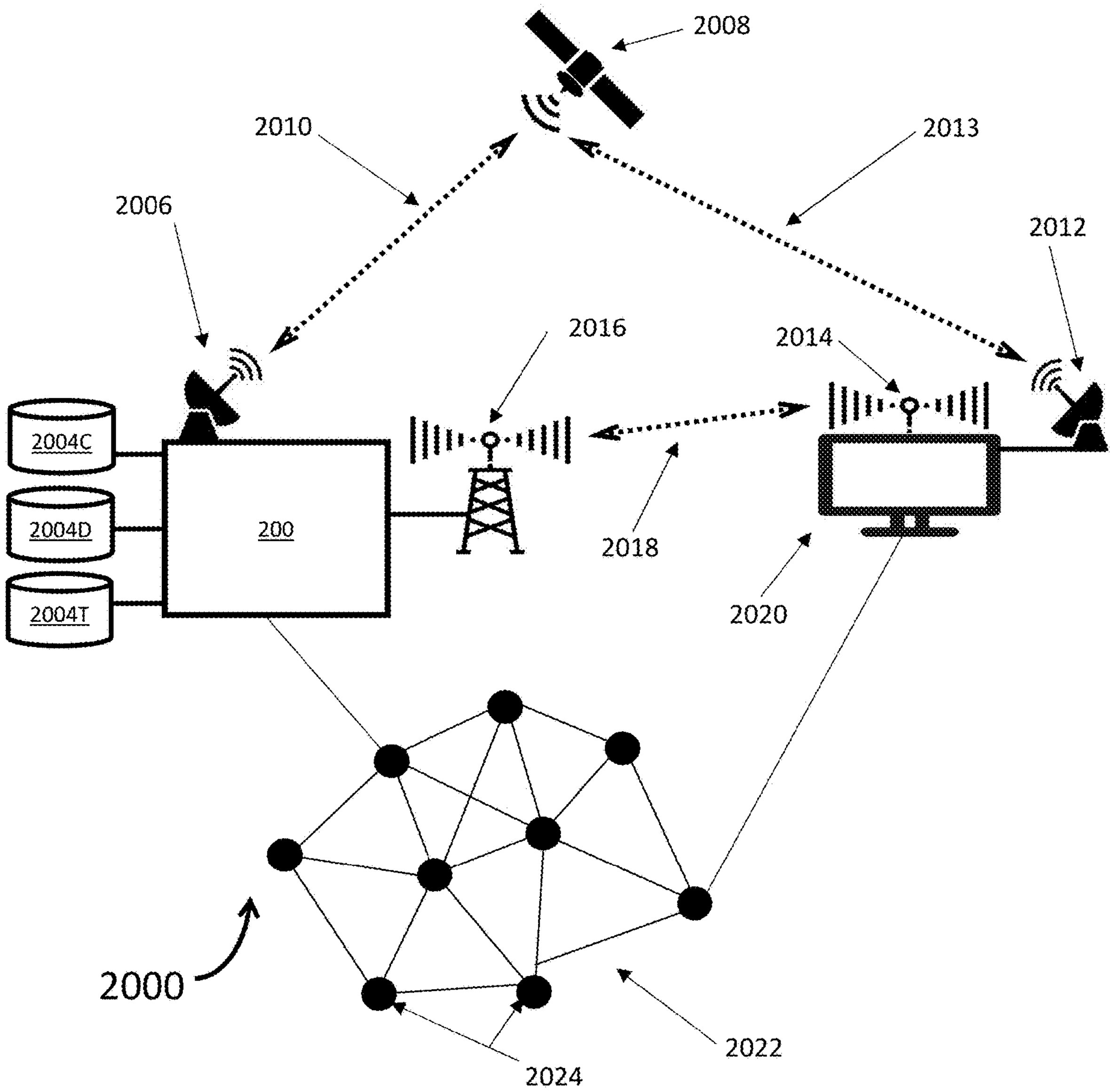
FIG. 10 illustrates the locked loop blockchain appliance coupled to a distributed network, a satellite network, and a wireless network.

FIG. 10 illustrates the locked loop blockchain appliance 200 coupled to a distributed network 2000, a satellite network 2008, and a wireless network 2016. FIG. 10 illustrates an exemplary distributed network 2000 for a collision resistant blockchain including Network Attached Storage (NAS) 2004C, 2004D, and 2004T, a network connected blockchain appliance 200, and a network connected terminal 2014 that can all communicate with each other via satellite communications links 2013 and 2010, wireless terrestrial communications links 2018, and communications links 2022 provided by the distributed network 2000. Appliance 200 is shown having Network Attached Storage (NAS) 2004C, 2004D, and 2004T. Appliance 200 has a satellite communication device 2006 allowing it to communicate with satellite 2008 through channel 2010. Appliance 200 also includes a radio antenna 2016 allowing it to communicate wirelessly over channel 2018 with terminal 2020 that has a WIFI antenna 2014. Appliance 200 can communicate with terminal 2020 through distributed network 2000 made up of a plurality of nodes 2024 coupled together by communications links 2022. Satellite 2008 may communicate with terminal 2020 through channel 2013 coupled to satellite communication device 2012 coupled to terminal 2020. Terminal 2020 includes a wireless antenna 2014 that may communicate across channel 2018 with appliance 200. In this environment, appliance 200 may access data to generate blockchain 200 from any storage device in communication with appliance 200 in networked environment 2000. Similarly, appliance 200 may store blockchain 200 on any storage device or node 2024 in communication with appliance 200 in networked environment 2000.

Figure 11:
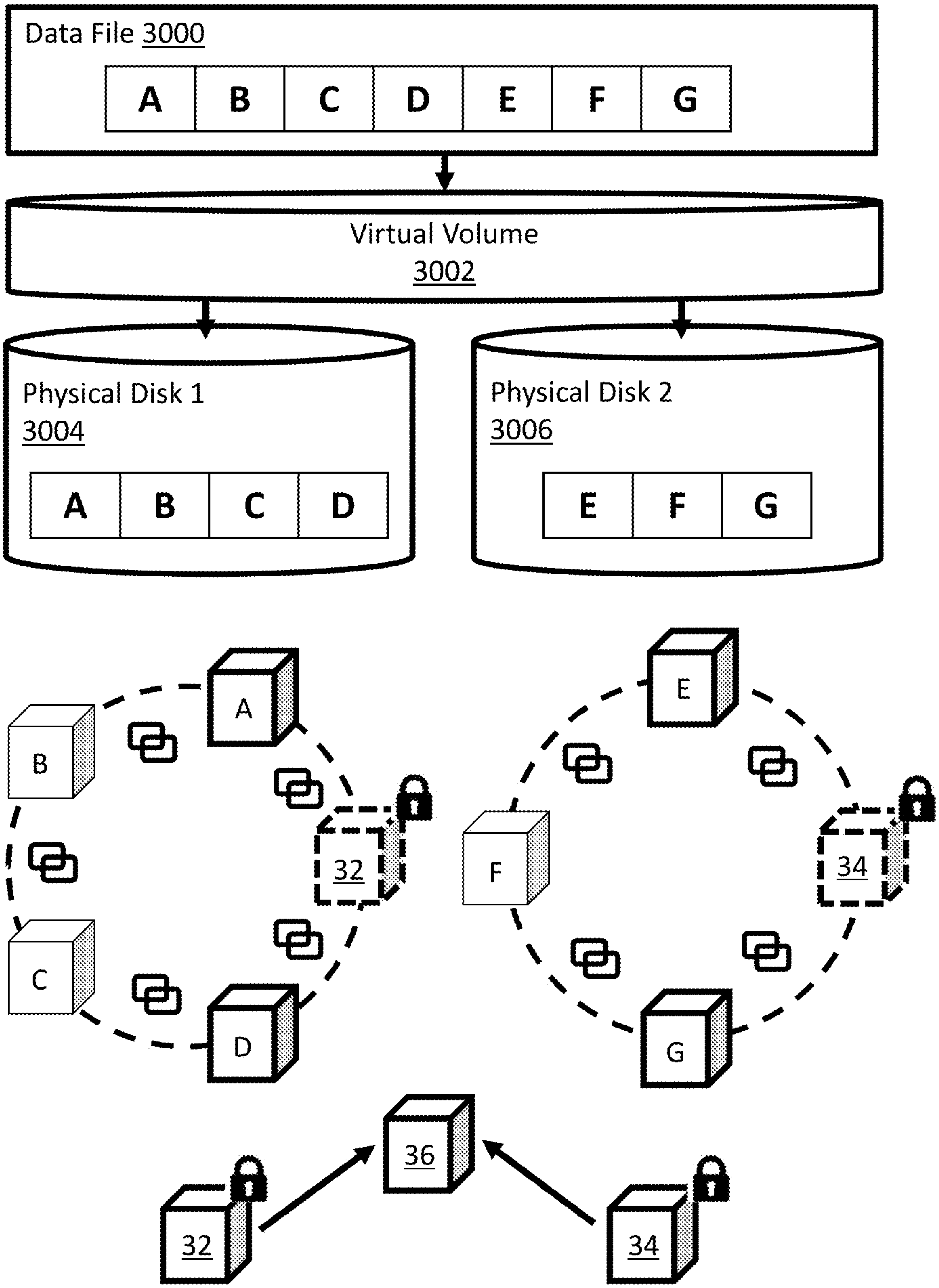
FIG. 11 illustrates a volume spanning data application for finite locked loop blockchains having blockchain lock blocks.

FIG. 11 illustrates a volume spanning data application for finite locked loop blockchains 20 having blockchain lock blocks 32 and 34. A spanned volume is a formatted partition in which data is stored on more than one hardware storage unit, yet appears as one volume. Hardware storage units may include Hard Disk Drives, Optical Drives, Solid State Drives, and Magnetic Tape Cartridges. Spanned volumes are a non-RAID drive architecture, and may be implemented in hardware or software. Spanned volumes may be referred to as Concatenation, SPAN, BIG, or JBOD. Spanning occurs when the volumes have files that continue from one volume to the next. When a save operation spans a volume, it pauses the save process when the current piece of media runs out of space and continues the save operation on the next piece of media. In the context of backup and recovery, a volume is the media to which data is saved. When a save operation is preformed and spans virtual images, the multivolume set of virtual images behaves just like a multi-volume set of any form of actual media. Data file 3000 is a blockchain having seven blockchain blocks identified by the letters A, B, C, D, E, F, and G. Data file 300 is being stored on virtual volume 3002 that is formed of two hardware storage units, physical disk 1-3004, and physical disk 2-3006. In this example, file 3000 spans disks 3004 and 3006 having blockchain blocks A, B, C, and D stored on disk 3004 and blockchain blocks E, F, and G stored on disk 3006. Each of the portions of file 3000 that are stored on an individual drive 3004 and 3006 are of finite length and can be secured with a blockchain lock block 30. In this example, the finite length of blockchain blocks A, B, C, and D stored on disk 3004 are secured into a finite loop locked blockchain by blockchain lock block 32. The blockchain blocks E, F, and G stored on disk 3006 are secured into a finite loop locked blockchain by blockchain lock block 34. The blockchain lock blocks for each of the individual portions of blockchain 3000 that are stored on separate volumes may then be linked together into a Merkle tree having a root node 36.

Figure 12:
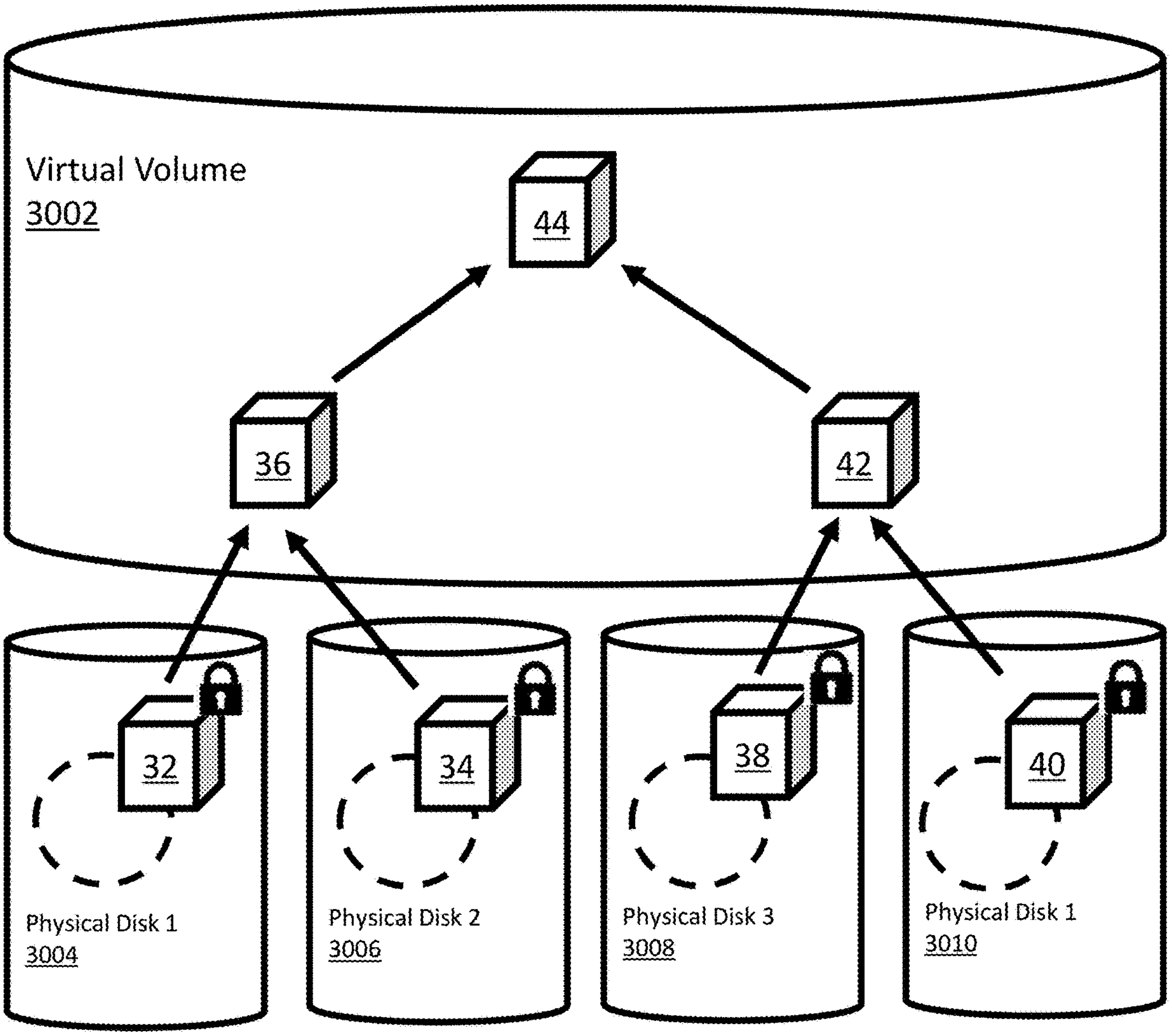
FIG. 12 illustrates a volume spanning data application for finite locked loop blockchains having blockchain lock blocks where blockchain lock blocks from multiple media drives are organized into a Merkle tree.

FIG. 12 illustrates a volume spanning data application for finite locked loop blockchains having blockchain lock blocks 32, 34, 38, and 40 where blockchain lock blocks 32, 34, 38, and 40 from multiple media drives 3004, 3006, 3008, and 3010 are organized into a Merkle tree having a root node 44 and branching nodes 38 and 42. Virtual volume 3002 includes four hardware storage drives in this example, 3004, 3006, 3008, and 3010. Drives may be any kind of hardware media drive such as solid state, magnetic, or optical. In a volume spanning operation, a blockchain is stored spanning across these four drives 3004, 3006, 3008, and 3010. Each of the portions of the blockchain stored across these four drives 3004, 3006, 3008, and 3010 is of finite length. Blockchain lock blocks 32, 34, 38, and 40 lock the finite length portions of the blockchain that are stored on each of the separate drives 3004, 3006, 3008, and 3010 into a finite loop blockchain as shown by the dashed circle with the blockchain lock blocks 32, 34, 38, and 40 each having a locked padlock symbol. The dashed loop represents a cryptographic hash loop as formed by the blockchain lock blocks. While the separate portions of the blockchain that are individually stored on drives 3004, 3006, 3008, and 3010 are separately secured by their own blockchain lock block 32, 34, 38, and 40, a Merkle tree is then used to secure the individual portions of the blockchain together by utilizing the blockchain lock blocks 32, 34, 38, and 40 as leaf nodes in a Merkle tree. Intermediate branch node 38 and 40 connect to nodes 32 and 34, and 38 and 40 respectively. Intermediate branch nodes 38 and 40 then both connect to Merkle root node 44 in order to secure the blockchain lock blocks together for enhanced blockchain security. Organizing all of the blockchain files locked with a blockchain lock block into a Merkle tree for a virtual volume in a volume spanning operation provides enhanced security for the storage of the blockchain file 3000 in the volume spanning operation.

Figure 13:
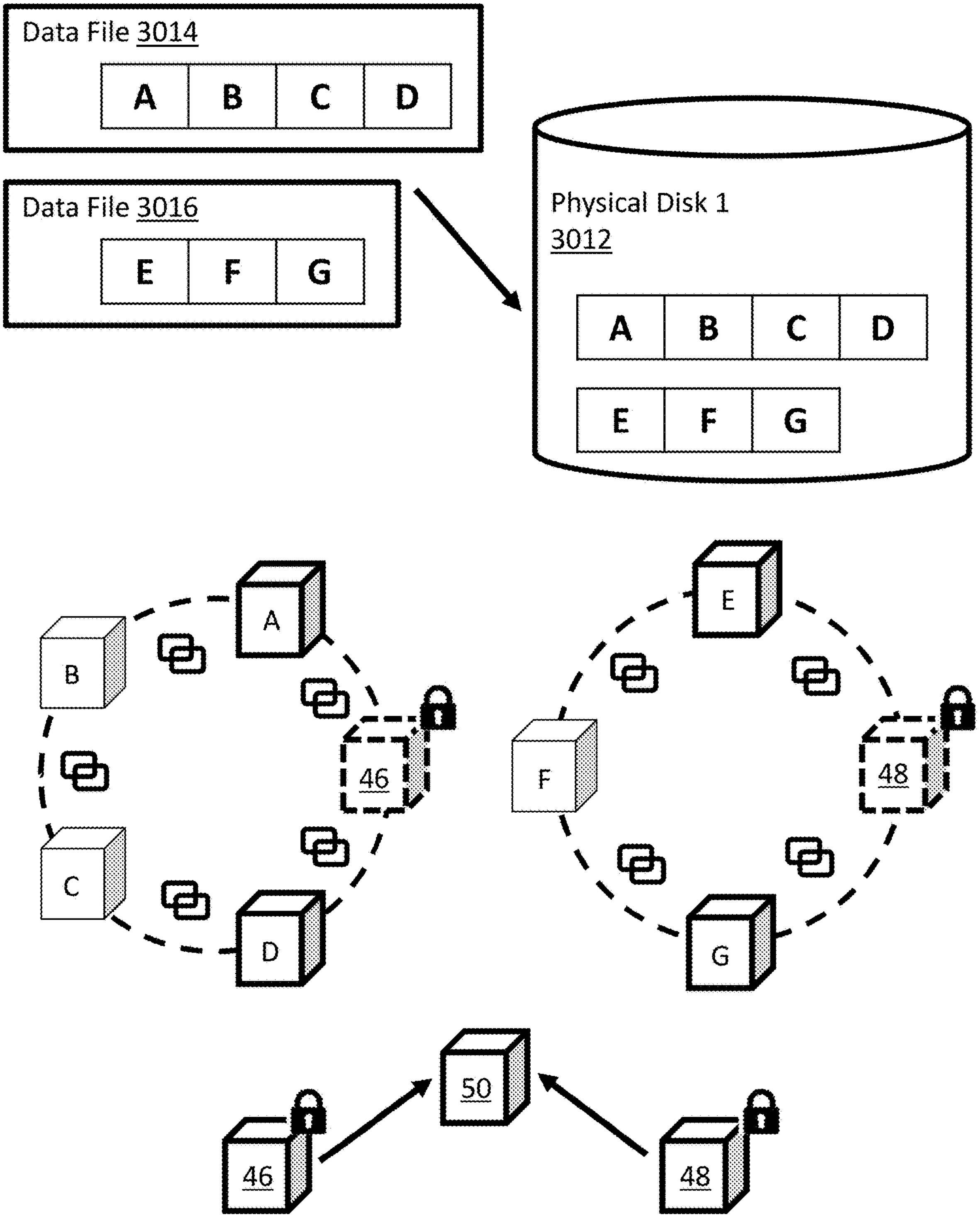
FIG. 13 illustrates a volume stacking data application for finite locked loop blockchains having blockchain lock blocks.

FIG. 13 illustrates a volume stacking data application for finite locked loop blockchains having blockchain lock blocks 46 and 48. When two or more data sets, such as a blockchain 20, are placed on the same hardware drive volume or set of hardware drive volumes, the data sets are said to be stacked. Data stacking is used to increase the efficiency of hardware drive volume use and to decrease the number of hardware drive volumes needed by allocation. Data set stacking is also useful when for sending data offsite as it is possible to group related data sets together on a reduced number of hardware drive volumes. In this example, there are two data files 3014 and 3016. File 3014 is a blockchain having blockchain blocks A, B, C, and D. File 3016 is a blockchain having blockchain blocks E, F, and G. Both blockchains 3014 and 3016 are stored on a single hardware drive 3012 and are therefore volume stacked. Both blockchains 3014 and 3016 are of finite length. Blockchain 3014 having blockchain blocks A, B, C, and D is secured into a finite locked loop blockchain by blockchain lock block 46 having the locked padlock symbol. Blockchain 3016 having blockchain blocks E, F, and G is secured into a finite locked loop blockchain by blockchain lock block 48 having the locked padlock symbol. While each file on hardware drive 3012 is separately secured by its own blockchain lock block 46 and 48 to provide additional data security, all of the blockchain files stored on drive 3012 may have their blockchain lock blocks formed into a Merkle tree for added data security. In this case, blockchain lock blocks 46 and 48 are the leaf nodes of a Merkle tree having a blockchain block 50 as the Merkle tree root node.

Figure 14:
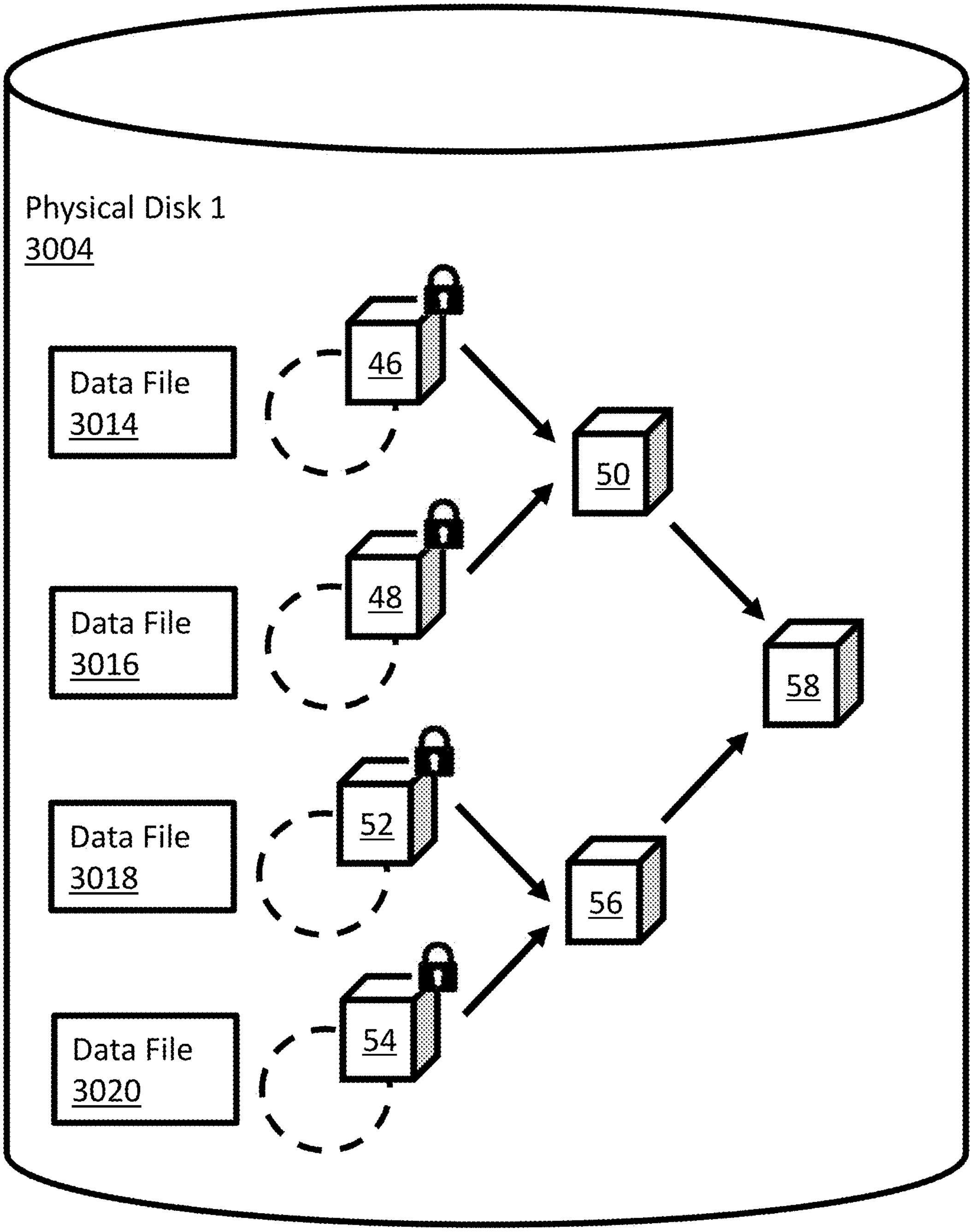
FIG. 14 illustrates a volume stacking data application for finite locked loop blockchains having blockchain lock blocks where blockchain lock blocks from multiple files are organized into a Merkle tree.

FIG. 14 illustrates a volume stacking data application for finite locked loop blockchains having blockchain lock blocks 46, 48, 52, and 54, where blockchain lock blocks 46, 48, 52, and 54 are from multiple files 3014, 3016, 3018, and 3020, and are organized into a Merkle tree. In this example, drive 3004 is shown having four different blockchain files 3014, 3016, 3018, and 3020. Each of the blockchain files 3014, 3016, 3018, and 3020 is secured by their own blockchain lock block 46, 48, 52, and 54 for data security into a finite loop blockchain, as symbolized by the dashed circle and the locked padlock symbol. While each blockchain file 3014, 3016, 3018, and 3020 is provided with data security through their respective blockchain lock blocks 46, 48, 52, and 54, linking all of the blockchain files stored on a drive in a stacking system through a Merkle tree structure using the blockchain lock blocks 46. 48, 52, and 54 as leaf nodes in the Merkle tree further enhances the integrity of the data and its ability to resist tampering. Branch nodes 50 and 56 interconnect leaf nodes 46. 48, 52, and 54 to Merkle tree root node 58.

Figure 15:
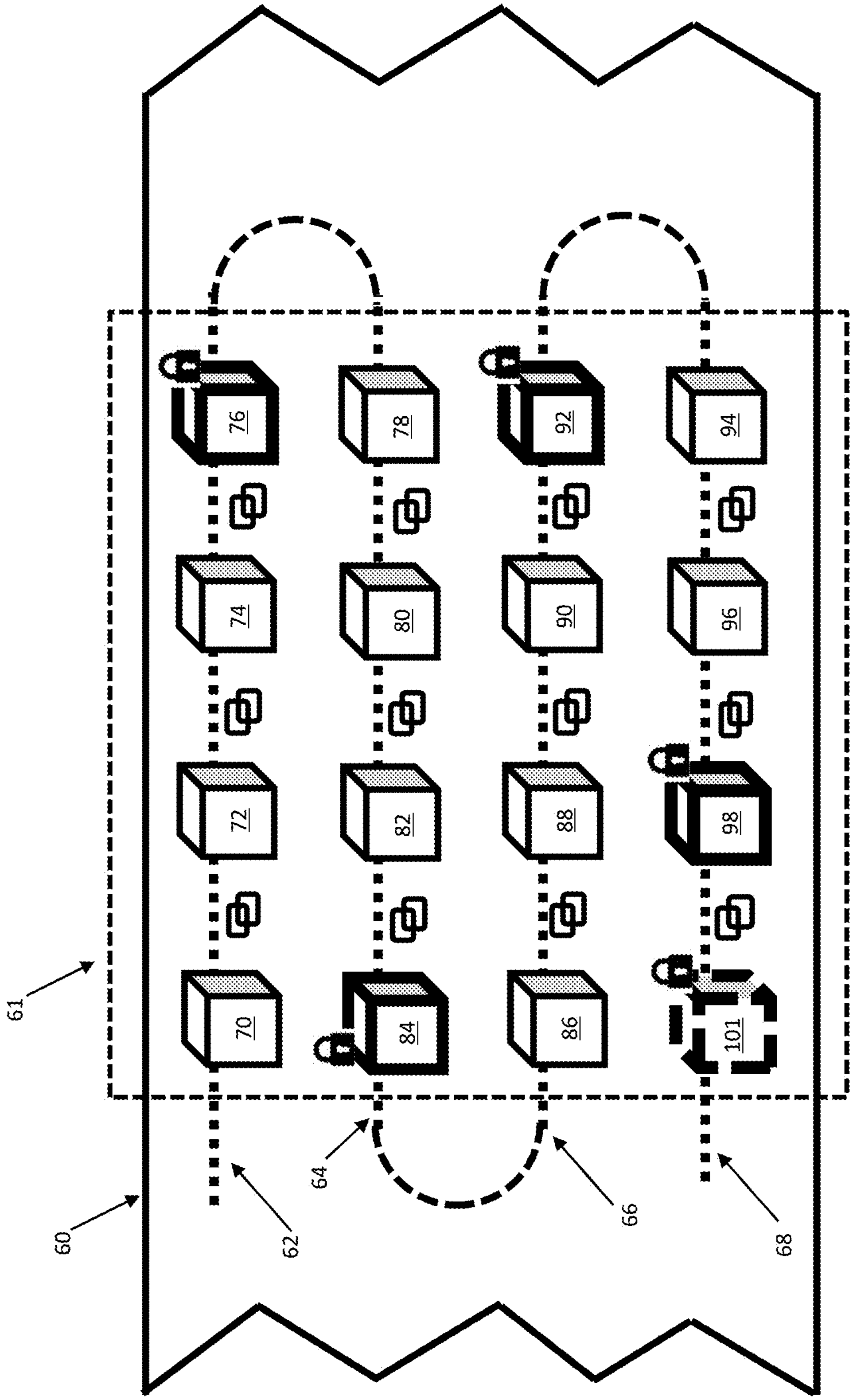
FIG. 15 illustrates the use of locking blockchain blocks in combination with an ECMA magnetic tape serpentine data format.

FIG. 15 illustrates the use of locking blockchain blocks 76, 84, 92, 98, and 101 in combination with an ECMA (European Computer Manufacturers Association) magnetic tape serpentine data format 61 on magnetic tape segment 60. The ECMA serpentine data formats for magnetic tape are defined technical standards, such as ECMA 197, 278, and 319. The ECMA-319 specification for LTO (Linear Tape Open) "Ultrium" includes a serpentine tape format. The ECMA-197 discloses a serpentine tape format. The ECMA-278 also has a serpentine tape format. These ECMA serpentine formats are merely exemplary and non-exclusive. The blockchain lock blocks may be used on any magnetic tape format, or any format for any type of media. In the serpentine data format, data is written on tracks 62, 64, 66, and 68. A blockchain file is shown stored on magnetic tape 60 in the serpentine format 60. The blockchain file includes blockchain blocks 70, 72, 74, 78, 80, 82, 86, 88, 90, 94, and 96. A finite portion of the blockchain file is stored on track 62 and includes blockchain blocks 70, 72, and 74. A finite portion of the blockchain file is stored on track 64 and includes blockchain blocks 78, 80, and 82. A finite portion of the blockchain file is stored on track 66 and includes blockchain blocks 86, 88, and 90. A final finite portion of the blockchain file is stored on track 68 and includes blockchain blocks 94 and 96. Blockchain block 70 is the first blockchain block of the file, the genesis block. Blockchain block 96 is the final terminating blockchain block for the blockchain. Blockchain lock block 101 links genesis blockchain block 70 to the terminating final blockchain block 96. In this example, each segment of the blockchain that is on a separate data track 62, 64, 66, and 68 is also secured by a separate blockchain lock block 76, 84, 92, and 98 respectively.

FIGS. 16-19 illustrate data tables for each of the blockchain blocks depicting the data contents of each blockchain block shown in the ECMA magnetic tape serpentine data format of FIG. 15. Genesis block 70 includes a message as data and a hash of itself. Blockchain blocks 72 and 74 includes hash digests from the previous blocks 70 and 72 respectively, as well as a hash of themselves. Blockchain lock block 76 includes a ledger listing the blockchain blocks that are on track 62 as well as the hash digest of blocks 70 and 74, and a hash of itself. Blockchain blocks 78, 80, and 82 include a hash digest from prior blocks 74, 78, and 80 respectively, as well as a hash of each block 78, 80, and 82. Blockchain lock block 84 includes a ledger listing the blockchain blocks that are on track 64 as well as the hash digest of blocks 78 and 82, and a hash of itself. Blockchain blocks 86, 88, and 90 include a hash digest from prior blocks 82, 86, and 88 respectively, as well as a hash of each block 86, 88, and 90. Blockchain lock block 92 includes a ledger listing the blockchain blocks that are on track 66 as well as the hash digest of blocks 86 and 90, and a hash of itself. Blockchain blocks 94 and 96 include a hash digest from prior blocks 90 and 94 respectively, as well as a hash of each block 94 and 96. Blockchain lock block 98 includes a ledger listing the blockchain blocks that are on track 68 as well as the hash digest of blocks 94 and 96, and a hash of itself. Blockchain lock block 101 is a lock block for the entire blockchain file spanning tracks 62, 64, 66, and 68. Blockchain lock block includes hash digests from block 70, block 96, which are the first and last data blockchain blocks in the blockchain across all data tracks, and a hash digest of itself as well as a ledger of all blockchain blocks in the blockchain.

FIG. 20 illustrates a blockchain lock block ledger table 104 that contains an inventory of the blockchain blocks 22, 24, 26, 28, and 30 forming the blockchain 20 of FIG. 2. In this exemplary embodiment, ledger 104 includes a listing of the blockchain block identification number for each blockchain block in blockchain 20. Ledger 104 also includes a listing of the hash digest type 108 used for each blockchain block in blockchain 20. Ledger 104 may also include a listing of the hash digests for each of the blockchain blocks in blockchain 20. Lastly, ledger 104 may also include a listing of the data contents of each of the blockchain blocks of blockchain 20, such as data type, file type, or file name.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A non-volatile computer tangible medium containing instructions for utilizing a distributed network to generate a blockchain having a finite number of blockchain blocks secured in a loop with a locking blockchain block comprising:

creating a blockchain on a distributed network having a genesis blockchain block and a terminating blockchain block that ends the blockchain;

creating a blockchain lock block that includes three hash digests: a hash digest of the genesis blockchain block, a hash digest of the terminating blockchain block, and a hash digest of the blockchain lock block that includes as data the hash digest from the genesis blockchain block and the hash digest from the terminating blockchain block, thereby cryptographically linking the genesis blockchain block to the terminating blockchain block through the blockchain lock block; and appending the blockchain lock block to the blockchain after the terminating blockchain block and storing it on the distributed network.

2. The medium of claim 1, wherein the blockchain lock block logically locks the genesis blockchain block to the terminating blockchain block forming the blockchain into a loop by cryptographically linking the genesis blockchain block to the terminating blockchain block by including the hash digests from the genesis blockchain block and the terminating blockchain block as data, thereby breaking the hash continuity of having a succeeding blockchain block being hashed to just a previous blockchain block only with the inclusion of hash digests from both the genesis and terminating blockchain blocks.

3. The medium of claim 1, wherein the blockchain 2 has a finite number of blockchain blocks connecting the genesis blockchain block to the terminating blockchain block.

4. The medium of claim 1 wherein multiple blockchain lock blocks are used to secure separate portions of a data file that are stored across multiple physical mediums using volume spanning.

5. The medium of claim 4, wherein one blockchain lock block is used to secure one portion of the data file that is stored on one of the multiple physical mediums.

6. The medium of claim 5, wherein a Merkle tree secures the multiple blockchain lock blocks together to logically link all of the separate portions of the data file stored on the multiple physical mediums together into the data file.

7. The medium of claim 1 wherein multiple blockchains are stored on a single storage medium using volume stacking, wherein each blockchain is separately secured into a loop using one blockchain lock block.

8. The medium of claim 7, wherein the blockchain 3 lock blocks for each blockchain on the single storage medium are linked together via a Merkle tree for the single storage medium.

9. The medium of claim 1 wherein the blockchain lock blocks are used with blockchained files stored on magnetic tape according to—a magnetic tape serpentine data format, wherein a blockchain lock block is used to separately secure each portion of a file stored on a separate data track of the magnetic tape.

10. The medium of claim 1, wherein the blockchain lock block includes a ledger identifying the genesis blockchain block, the terminating blockchain block, and all blockchain blocks linking the genesis blockchain block to the terminating blockchain block.

* * * * *